US006994947B2

(12) United States Patent
Machida (10) Patent No.: US 6,994,947 B2
(45) Date of Patent: Feb. 7, 2006

(54) PHOTOCHEMICAL HOLE BURNING MEDIA (75) Inventor: Kenichi Machida, Minoo (JP)

(73) Assignee: Osaka University, Osaka (JP)

( * ) Notice: Subject to any disclaimer, the term of this patent is extended or adjusted under 35 U.S.C. 154(b) by 221 days.

(21) Appl. No.: 10/084,480

(22) Filed: Feb. 28, 2002

(65) Prior Publication Data

US 2002/0162948 A1 Nov. 7, 2002

(30) Foreign Application Priority Data

Mar. 1, 2001 (JP) .............................. 2001-057113

(51) Int. Cl.
  *G11B 7/26* (2006.01)
(52) U.S. Cl. ............ 430/270.16; 430/945; 430/270.15; 365/107
(58) Field of Classification Search ................ 430/945, 430/270.15, 270.16; 365/107
  See application file for complete search history.

(56) References Cited

U.S. PATENT DOCUMENTS 4,810,674 A * 3/1989 Che et al. ...................... 501/12
6,077,629 A * 6/2000 Parker et al. ................... 430/1

FOREIGN PATENT DOCUMENTS

| EP | 263428 | * | 4/1988 |
| JP | 09-227861 | * | 9/1997 |
| JP | 09-230396 | * | 9/1997 |
| JP | 10-231116 | * | 9/1998 |
| JP | 2000-345037 | * | 12/2000 |

OTHER PUBLICATIONS

Bhattacharyya et al. 'Study of energy transfer in a naphthalene-liked crown ether . . . ', Chem Phys. Lett., vol. 297 pp 154-164 (Nov. 1998).*
Klonkowski et al., 'Improvement of emission intensity . . . . ', J. Alloys & Compounds, vol. 300-301, pp. 55-60 (2000).*
Klonkowski et al., 'Improvement of emission intensity . . . . ', J. Alloys & Compounds, vol. 300-301, pp. 55-60 (2000).*
Kummerl et al., 'Hole burning with chelate complexes . . . ', Phys. Chem., vol. 96 pp. 10688-10693 (1992).*
Hawley's Condensed Chemical Dictionary, 14$^{th}$ Ed. pp. 222 and 311, citing "cavitands" and "cryptands" (2001).*
IUPAC Compendium of Chemical Terminology, 2$^{nd}$ Ed. (1997), citation of "cryptand" .*
Ueda et al., "Preparation and persistent spectral holeburning properties of rrare earth complex dispersed in silica composite materials", Kidorui vol. 36, pp. 262-263 (2002).*
Machine translation of JP 2000-345037.*

* cited by examiner

*Primary Examiner*—Martin Angebranndt
(74) *Attorney, Agent, or Firm*—Oliff & Berridge, PLC (57) ABSTRACT

A photochemical hole burning medium is composed of a material in which a rare earth complex and a reducing agent is dispersed in a solid matrix. The rare earth complex may be at least one complex selected from the group consisting of a europium (III) crown ether complex, a europium (III) polyether complex, and a europium (III) cryptand complex.

4 Claims, 11 Drawing Sheets

(a) $SiO_2\text{-}Ta_2O_5$ (b) $SiO_2\text{-}ZrO_2$

FIG. 11

Excited spectra of $Si_2O:Eu(15C5)^{3+}$, indene before and after irradiation with laser at 77K and differencial spectrum therebetween

PHOTOCHEMICAL HOLE BURNING MEDIA

BACKGROUND OF THE INVENTION (1) Field of the Invention

The present invention relates to optical memories for wavelength multiple-type high density recording, and more particularly the invention relates to optochemical hole burning media.

(2) Related Art Statement

Optical recording media in which recorded information can be rewritten to another are broadly classified into the heat mode type and the photon mode type according to the operating principles. In the former, different states: (recorded state/erased state) which are optically discernible from each other are reversely changed by utilizing heating and cooling of the medium with irradiation of laser beam. Magneto-optical media, phase transition media, organic media, etc. belong to this type. In the photon mode type, an intrinsic energy of a light determined by its wavelength is directly used to cause reversible optical changes. Photochromic media and optochemical hole burning (PBB) media belong to this type.

The Persistent Spectral Hole Burning (PSHB) is the phenomenon that when laser beam is irradiated upon a solid in which molecules or ions having optical absorption ability, a hole persistently appears in the spectrum at a wavelength equal to that of the irradiated beam. The hole burning is an effective measure as a high resolution spectroscopy for the solids, and is expected to be applied as a wavelength-multiple type high density optical memory in case that the width (uniform width) of the hole of the hole is smaller than that (non-uniform width) of the absorption spectrum. That is, when the hole burning is effected while the wavelength of the irradiating laser, a plurality of holes independent of one another can be formed in a single spot. If bids of 1 and 0 are made correspondent to the presence and absence of such a hole, the wavelength multiple recording is feasible, so that optical memories at a super high density can be realized. As a material for such an optical memory, materials into which rare earth ions are introduced are known.

However, the media that are at a practical level or a near practical level are of the heat mode type. In any of the optically recording media of the heat mode type, recording is effected by using a single-wavelength light, which poses a limit upon the recording capacity.

On the other hand, the photon mode type is a level of searching fundamental materials. Among the photon mode type optical media, the optochemical hole burning media have the merit that the recording capacity can be greatly increased by overwriting information data at one location at different wavelengths. However, the optochemical hole burning media are still at a level of searching fundamental materials, including the above-mentioned rare earth ion-introduced materials, and materials considered preferable for the optochemical hole burning media are still at a study level. Therefore, materials which can be used for the optochemical hole burning media have been desired to be developed.

SUMMARY OF THE INVENTION

Therefore, it is an object of the present invention to provide optochemical hole burning media which can greatly increase the recording capacity.

In order to accomplish the above object, the present inventor repeatedly made strenuous studies on materials in which various complexes were dispersed in a $SiO_2$ matrix, and consequently be discovered materials which can hold holes even at room temperature.

The photochemical hole burning medium according to the present invention comprises a material in which a rare earth complex and a reducing agent are dispersed in a solid matrix.

The following are preferred embodiments of the photochemical hole burning medium according to the present invention.

(1) The rare earth complex is at least one complex selected from the group consisting of europium (III) crown ether complexes, europium (III) polyester complexes, and europium (III) cryptand complexes.

(2) The reducing agent is an electron-donating composite compound. In this preferred embodiment of the optochemical hole burning medium according to the present invention, the rare earth complex contributing to the formation of the hole and the reducing organic molecules contributing to the stabilization of the hole are held in the form of an electron-donating composite compound in a uniformly dispersed state.

(3) The electron-donating composite compound is a silane compound or a disilazane compound.

(4) The silane compound is a hexaalkyl disilazane represented by hexamethyl disilane, and the disilazane compound is a hexaalkyl disilazane represented by hexamethyldisilazane.

(5) The electron-donating composite compound is an organic tin compound.

(6) The organic tin compound is a compound represented by RSnSnR in which R is an alkyl group or an aryl group.

(7) The solid matrix is at least one glass-forming compound selected from the group consisting of silica, germanium oxide, boron oxide, phosphorus pentaoxide and tellurium oxide.

(8) At least one compound selected from the group consisting of $Al_2O_3$, $Ga_2O_3$, $In_2O_3$, $TiO_2$, $ZrO_2$, $Nb_2O_5$ and $Ta_2O_5$ is contained in said solid matrix.

These and other objects, features and advantages of the invention will be appreciated upon reading of the following description of the invention when taken in conjunction with the attached drawings, with the understanding that any modifications, variations and changes could be easily made by the skilled person in the art to which the invention pertains.

As a further preferable embodiment of the photochemical hole burning medium according to the present invention, the reducing agent has an oxidation/reduction potential of not more than 1 V.

BRIEF DESCRIPTION OF THE DRAWINGS

For a better understanding of the invention, reference is made to the attached drawings, wherein:

FIGS. 6(a) to 6(c) are graphs showing heat cycle characteristics of optochemical hole burning media a further embodiment according to the present invention in which FIG. 6(a) shows the heat cycle characteristic of $SiO_2$:$Eu(15C5)^{3+}Me_3SiSiMe_3$, and FIGS. 6(b) and 6(c) show the heat cycle characteristics of $SiO_2$:$Eu(15C5)^{3+}Me_3SnSnMe_3$ and $SiO_2$:$Eu(15C5)^{3+}$, respectively.

FIGS. 7(a) and 7(b) are graphs showing heat cycle characteristics of optochemical hole burning media with $SiO_2$:$Eu(15C5)^{3+}Me_3SiSiMe_3$ of other embodiment according to the present invention in which FIG. 7(a) shows the heat cycle characteristics of in the use of 3 mol % $Me_3SiSiMe_3$ for $SiO_2$:$Eu(15C5)^{3+}Me_3SiSiMe_3$, and FIGS. 7(b) the heat cycle characteristic in the use of 6% $Me_3SiSiMe_3$ for $SiO_2$:$Eu(15C5)^{3+}Me_3SnSnMe_3$.

DETAILED DESCRIPTION OF THE INVENTION

The photochemical hole burning medium according to the present invention comprises a material in which a rare earth complex and a reducing agent dispersed in a solid matrix. That is, the present invention is directed to the optochemical hole burning medium using the material exhibiting the optochemical hole burning phenomenon.

In the present invention, the term "solid matrix" means host molecules of the optochemical hole burning medium, and is not particularly limited. For example, as the solid matrix, at least one glass-forming compound selected from the group consisting of silica, germanium oxide, boron oxide, phosphorus pentaoxide and tellurium oxide may be recited. Further, at least one compound selected from the group consisting of $Al_2O_3$, $Ga_2O_3$, $In_2O_3$, $ZrO_2$, $Nb_2O_5$ and $Ta_2O_5$ may be contained in the solid matrix. From the standpoint of easy productivity with use of a sol-gel method, silica may be recited as the solid matrix.

As the rare earth complex, at least one complex selected from the group consisting of a europium (III) crown ether complex, a europium (III) polyether complex, and a europium (III) cryptand complex may be recited.

In view of the fact that easy reduction from trivalent to a divalent state, which is considered to be a factor of inducing the optochemical hole burning effected, the europium (III) crown ether complex is preferred as the rare earth complex. As large ring compounds represented by the crown ether, large ring compounds having heteroatoms such as oxygen, nitrogen, sulfur, etc., e.g., 12-crown-4, 15-crown-5, 18crown-6, 24crown-8, dibenzo-18-crown-6, cryptand[2, 2], cryptand [2, 2, 2], etc. may be recited. In the present invention, such large ring compounds may be recited.

From the standpoint of easy complex formation of divalent europium ions, 15-crown-5 (hereinafter referred to as "15C5") is preferred as the crown ether.

The rare earth metals are not particularly limited, and Eu, Sm, Pr, etc. may be recited. From the easy complex formation of divalent europium ions, Eu may be recited as the rare earth element.

The reducing agent used in the present invention is not particularly limited so long as it can readily reduce the are earth ions while not causing a reverse reaction and its absorption does not overlap with that of a zerophone line of the rare earth ions. Preferably, organic molecular compounds which exhibit compatibility with the rare earth complex may be recited. From the standpoint of easy transportation of electrons with the rare earth ions, the reducing agent may be an electron-donating composite compound. As the electron-donating composite compound, a silane compound, a disilazane compound or the organic tin compound may be recited.

As the silane compound, at least one a hexaalkyl disilazane represented by hexamethyl disilane may be recited. As the disilazane or a hexaalkyldisilazane represented by hexamethyl disilazane may be recited. From the standpoint of being readily dissolved in a common solvent to be used in the sol-gel reaction, hexamethyl disilane and disilazane compound may be recited as the silane compound and the disilazane compound, respectively.

As the electron-donating composite compound, an organic tin compound may be used. As the organic tin compound, a compound represented by RSnSnR in which R is an alkyl group or an aryl group may be recited. From the standpoint of being ready dissolved in a common solvent to be used in the sol-gel reaction, R is preferably a methyl group.

The use amount of the reducing agent varies depending upon rare ions, complex ligands, solid matrixes, etc. as employed, and is not particularly limited. From the standpoint of maintaining the high hole stability, up to 20 mol % of the reducing agent may be used relative to the entire amount of the metal component constituting the solid matrix. The use amount is preferably 3 to 6 mol % from the standpoint of the transparency and light transmission of the medium.

According to a further preferable embodiment of the photochemical hole burning medium of the present invention, the reducing agent has an oxidation/reduction potential of not more than 1.5 V (vs. SCE). The reason is that the oxidation potential of $E^{3+}/Eu^{2+}$ is about −0.43 V (vs. NHE), the Eu is converted to an excited state by irradiation with laser beam, and $Eu^{3+}$ can be reduced to $Eu^{+2}$, if the oxidation/reduction potential is not more than 1.5 V (vs. SCE).

Therefore, any reducing organic molecule having the oxidation/reduction potential of not more than 1.5 V (vs. SCE) as the reducing agent can theoretically reduce $Eu^{3+}$ to $Eu^{2+}$ and can exhibit the hole burning effect.

Even other organic molecules having an oxidation/reduction potential of more than 1.5 V (vs. SCE) can cause hole in relation to other rear earth complex. In such a case, the organic molecules having the oxidation/reduction potential of more than 1.5 V (vs. SCE) can be used.

Next, the method for producing the optochemical hole burning medium according to the present invention will be explained. The optochemical hole burning medium according to the present invention can be produced by using the ordinary sol-gel method, for example. The sol-gel method is generally a method in which a gel is obtained by dewatering a hydroxide-containing sol, and an inorganic oxide or the like having a given shape or in the form of a thin or thick film on a substrate is prepared by heating and drying the gel.

EXAMPLES

The present invention will be explained in more detail with reference to specific Examples, but the invention is never intended to be interpreted as being limited to these Examples.

Example 1

An optochemical hole burning medium using a solid matrix in which $SiO_2$ was added to $ZrO_2$ was prepared by the sol-gel method. The preparing procedure was as follows. A few or several drops of hydrochloric acid were added as a catalyst into a solution of $Si(OC_2H_5)_4$:$H_2O$:$C_2H_5OH$=1:1:5 (molar ratio), which was refluxed for one hour. Then, a metal alkoxide:$Zr(OC_2H_5)_4$ was added to the resulting solution such that Si:Zr=7:3, 5:5 or 3:7, followed by one hour refluxing. $EuCl_3$:$H_2O$:$C_2H_5OH$=0.03:4:4:0.03 was added to the resultant, which was subjected to drying at 50° C. for 2 weeks or 90° C. for 2 days. Thereby, $(SiO_2—ZrO_2)$:[Eu(15C5)]$^{3+}$ was obtained.

After the resulting sample was cooled by using a cryostat, a hole was formed through being irradiated with laser beam of rhodamine 6G colarant at 100 mW/mm$^2$ for 10 minutes. The stability of the hole was evaluated based on temperature cycles that the sample having a hole formed at 77K was heated to a given temperature, held at this temperature for about 1 minutes and cooled again to 77K.

More specifically, the hole was formed by irradiating laser beam at 77K upon each of samples in which 3 mol % of $EuCl_3$ and 9mol % of 15-crown-5(15C5) were incorporated into a ceramic material formed by mixing $SiO_2$ with $ZrO_2$ at a given ratio.

Figure 1:
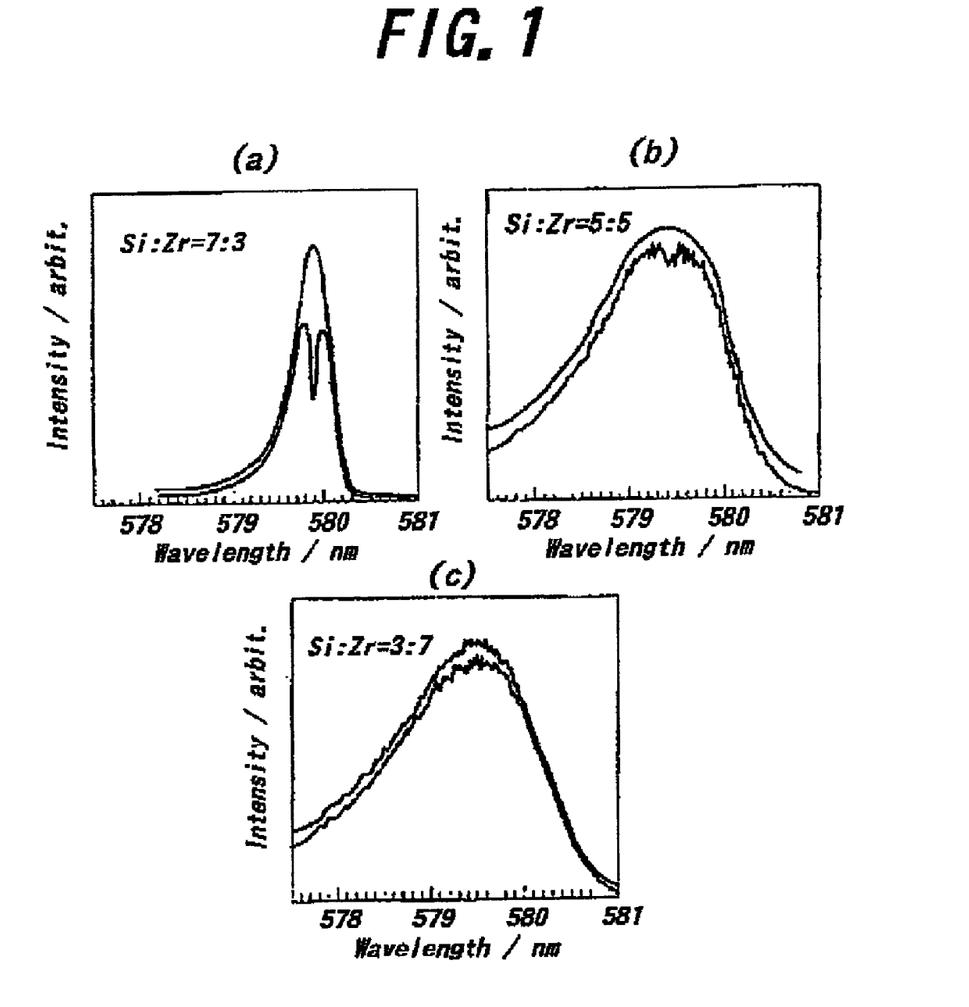
FIGS. 1(a) to 1(c) are graphs showing excitation spectra of $SiO_2$—$ZrO_2$: $[Eu(15C5)]^{3+}$ before and after irradiation with laser beams.

FIGS. 1($a$), 1($b$) and 1($c$) show excitation spectra of $^7Fo$-$^5Do$ before and after the laser irradiation upon these samples.

As a result, it was seen that as the content of $ZrO_2$ in the solid matrix increased, the non-uniform width was enlarged. Thus, it is considered that the local structure near Eu$^{3+}$ ions in the matrix become non-uniform due to the incorporation of $ZrO_2$. However, the depth of the hole formed decreased with increase in the incorporated amount of $ZrO_2$. Further, an anti-hole was seen in the case of $SiO_2$:$ZrO_2$=5:5. This is interpreted such that the formation of a complex between Eu$^{3+}$ ions and 15C5 was interrupted by the formation of a firm network.

Figure 2:
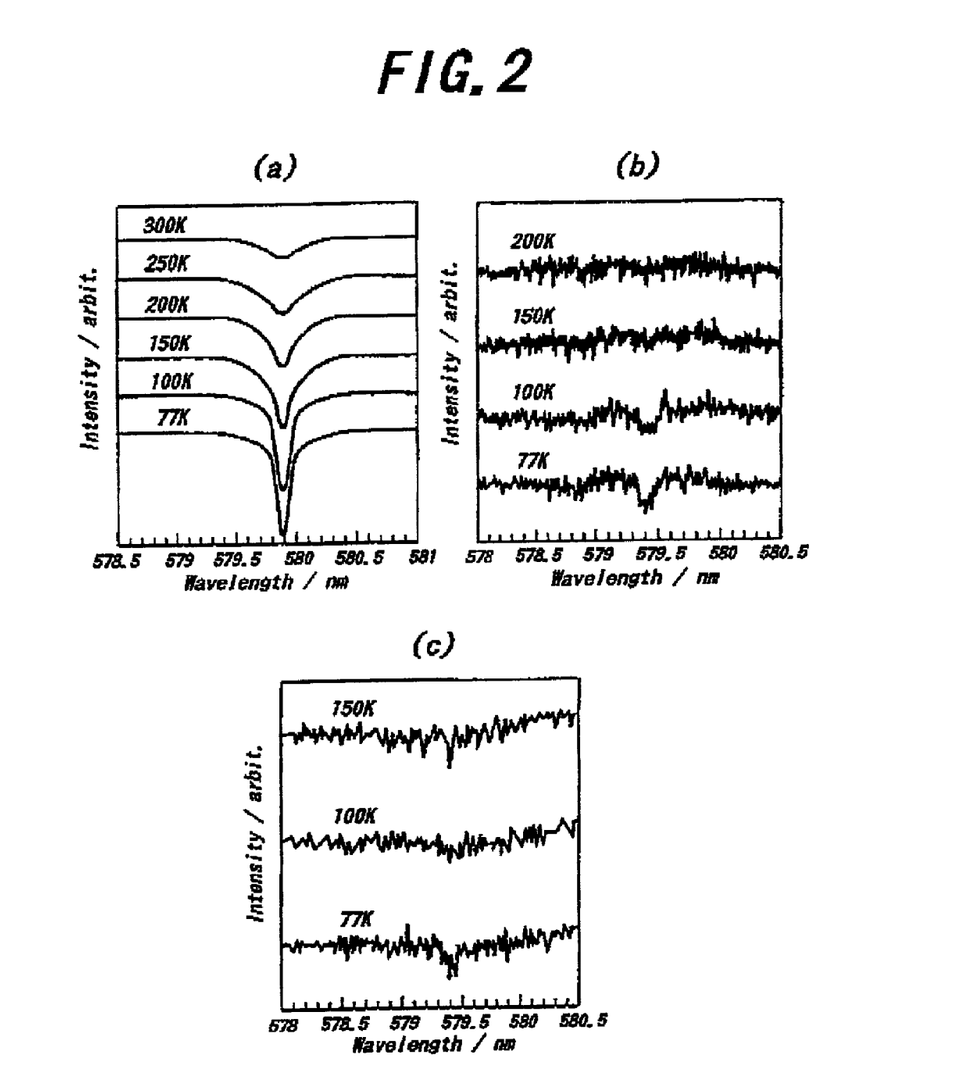
FIGS. 2(a) to 2(c) are graphs showing heat cycle characteristics of $SiO_2$— $ZrO_2$:$[Eu(15C5)]^{3+}$ in which FIGS. 2(a), 2(b) and 2(c) correspond to $SiO_2$:$ZrO_2$ =7:3, $SiO_2$:$ZrO_2$=5:5, and $SiO_2$:$ZrO_2$=3:7, respectively.

FIGS. 2($a$), 2($b$) and 2($c$) show heat cycle characteristics of $(SiO_2—ZrO_2)$: Eu(15C5)$^{3+}$ each having a hole formed at 77K. FIG. 2($a$) corresponds to $SiO_2$: $ZrO_2$=7:3, FIG. 2($b$) to $SiO_2$:$ZrO_2$=5:5, and FIG. 2($c$) to $SiO_2$:$ZrO_2$=3:7.

When the ingredients constituting the matrix were $SiO_2$:$ZrO_2$=7:3, the hole could be maintained up to 300K. When the ingredients constituting the matrix were $SiO_2$:$ZrO_2$=5:5, the hole could be maintained up to 150K. When the ingredients constituting the matrix were $SiO_2$:$ZrO_2$=5:5, the hole could be maintained up to 100K. This revealed that if the $ZrO_2$ is added at a high concentration, the hole-forming efficiency decreases and the hole cannot be maintained at high temperatures, although the non-uniform width increases.

Example 2

Figure 3:
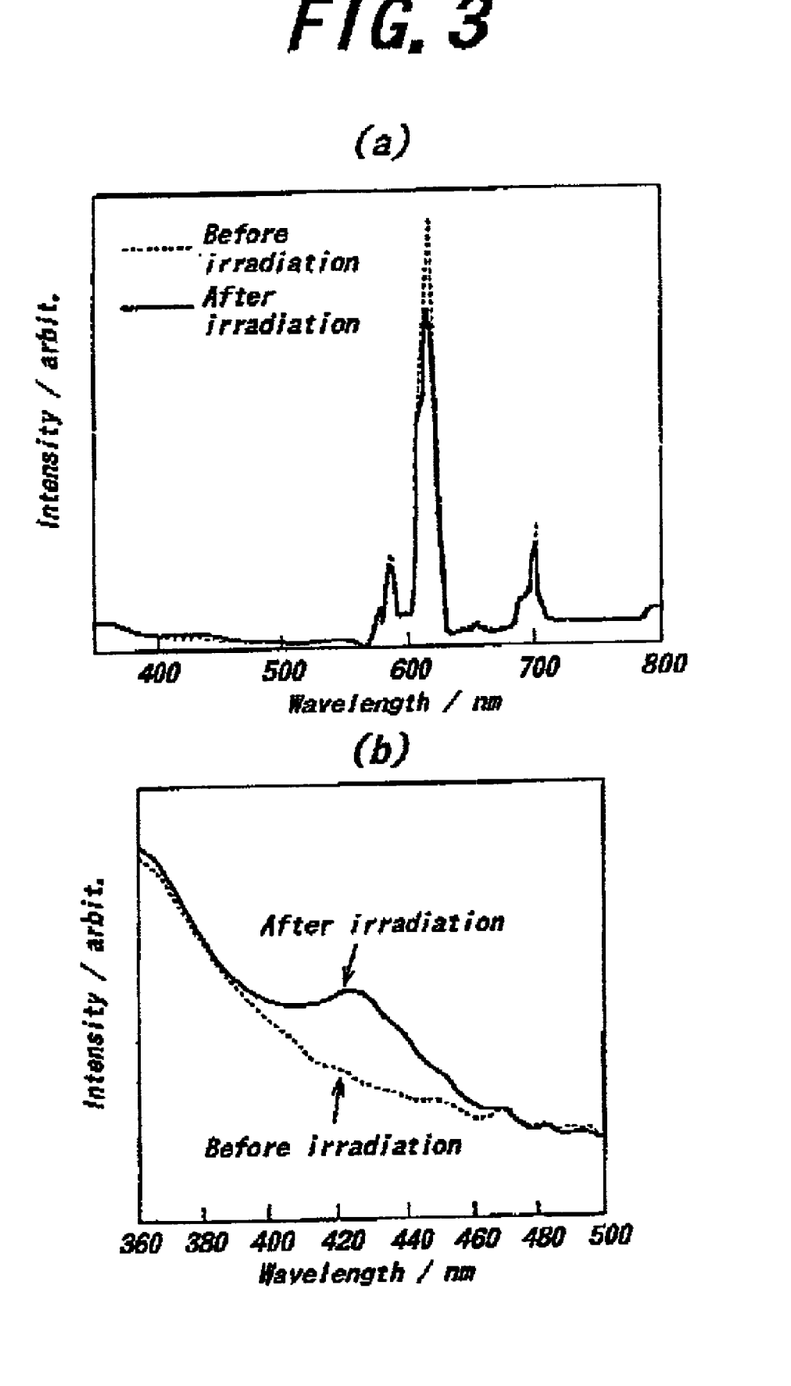
FIGS. 3(a) and 3(b) are graphs showing fluorescent spectra of $SiO_2$:$[Eu(15C5)]^{3+}$ before and after laser beam irradiation, respectively.

Next, in order to clarify a cause for the high hole-maintaining temperatures of the above-mentioned composite glasses, R6G laser beams at an intensity of 300 mWmm$^{-2}$ and a wavelength of 579.6 mm were irradiated upon $SiO_2$: Eu(15C5)$^{3+}$ ($EuCl_3$=3 mol %, 15C5=9 mol %) at room temperature for 2 hours, and fluorescent spectra were examined before and after the irradiation. Results of the fluorescent spectra are shown in FIGS. 3($a$) and 3($b$). As a result, it was clarified in the laser-irradiated samples that the intensity of light emission at 570–720 nm based on Eu$^{+3}$ ions decreased, whereas fluorescent peak based on Eu$^{+2}$ ions newly appeared at around 420 nm.

From the above, it was suggested that the optical reduction from Eu$^{3+}$ ions to Eu$^{2+}$ ions was caused as the PSHB mechanism by the laser irradiation.

Example 3

From the results stated in Example 2, it was clarified that the reduction from Eu$^{3+}$ to Eu$^{2+}$ can exhibit excellent hole-maintaining characteristic.

Thus, various reducing agents were dispersed in trial into solid matrixes together with rare earth complexes.

First, tests were performed with a silane compound being used as a reducing agent. More specifically, $SiO_2$:Eu(15C5)$^{3+}$, $Me_3SiSiMe_3$ was prepared. The preparing procedure was as follows. A few or several drops of hydrochloric acid were added as a catalyst into a solution of $Si(OC_2H_5)_4$: $H_2O$:$C_2H_5OH$=1:1:5 (molar ratio), which was refluxed for one hour. Then, $EuCl_3$:$H_2O$:$C_2H_5OH$:15C5:$Me_3SiSiMe_3$= 0.03:4:4:0.03:0.06 (molar ratio) were added to the resulting solution, which was subjected to drying at 50° C. for one week or at 90° C. for 2 days. Thereby, $SiO_2$:Eu(15C5)$^{3+}$, $Me_3SiSiMe_3$ was obtained. Loaded compositions for typical glass materials are shown in Table 1.

TABLE 1

| Loaded composition for the typical glass materials | | | | | | |
|---|---|---|---|---|---|---|
| TEOS (1:1:5) reflux liquid: | EuCl$_3$: | H$_2$O: | C$_2$H$_5$OH: | 15-crown-5: | Me$_3$SiSiMe$_3$ | (molar ratio) |
| 1 | 0.03 | 4 | 4 | 0.03 | 0.06 | |
| 1 | 0.03 | 4 | 4 | 0 | 0.06 | |
| 1 | 0.03 | 4 | 4 | 0.03 | 0.03 | |
| 1 | 0.03 | 4 | 4 | 0 | 0.03 | |

Samples to which neither $Me_3SiSiMe_3$ nor the crown ether was added were prepared in the same manner.

In the same manner as mentioned above, $SiO_2$:Eu$(15C5)^{3+}$, $Me_3SnSnMe_3$ was obtained.

With respect to the hole burning characteristic, a holes was formed by using rhodamine 6G colarant laser. Heat cycle tests were effected such that after the hole was formed at 77K, then the temperature was successively raised to 100K, 150K, 200K, 250K and 300 K, the temperature of 300K was maintained for about 1 minute and returned to 77K again, and an excitation spectrum was measured.

Figure 4:
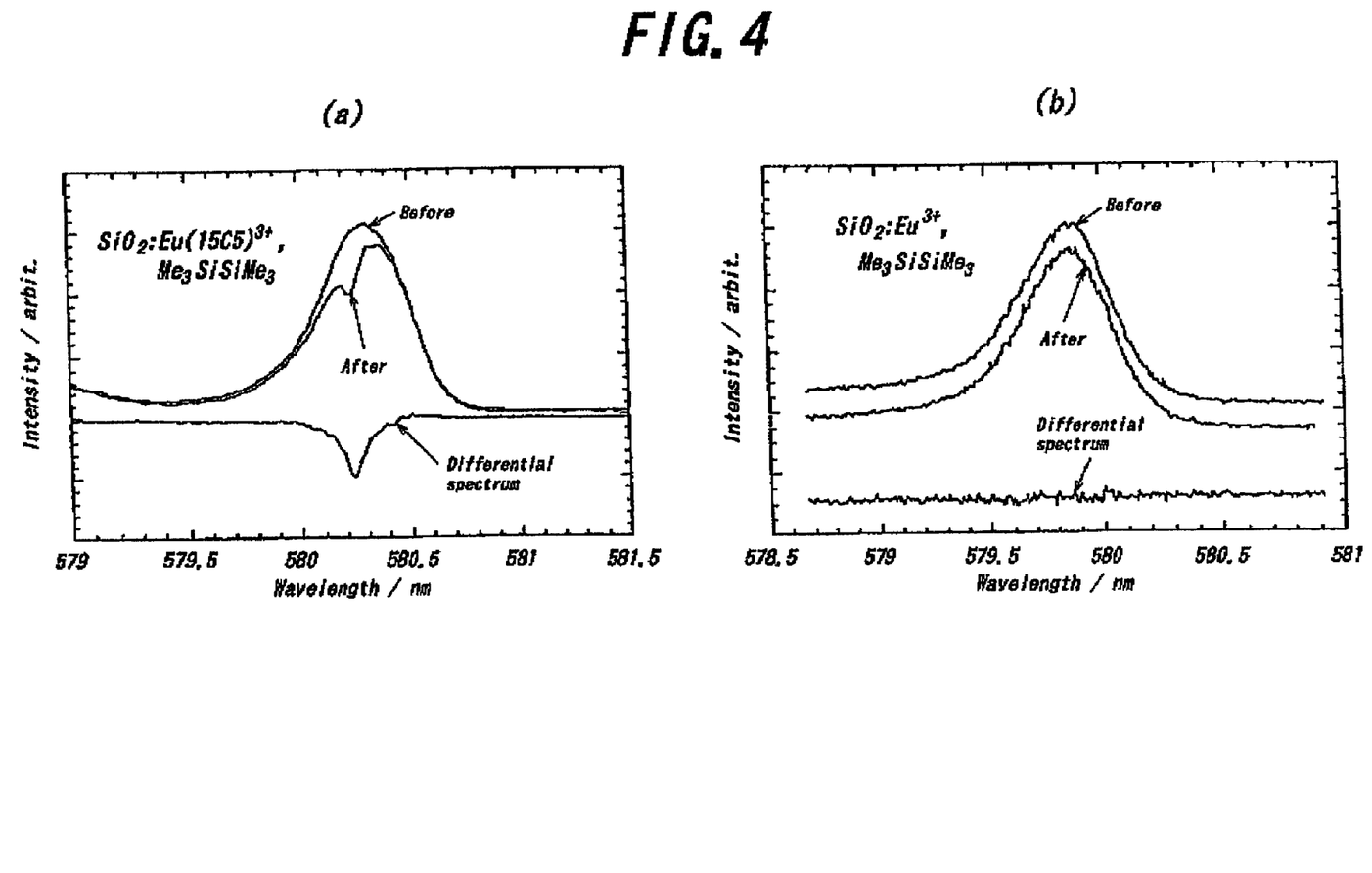
FIGS. 4(a) and 4(b) are graphs showing spectra of the optochemical hole burning media according to an embodiment of the present invention before and after laser beam irradiation, respectively, in which FIGS. 4(a) and 4(b) correspond to $SiO_2$:$Eu(15C5)^{3+}Me_3SiSiMe_3$ and $SiO_2$:$Eu^{3+}Me_3SiSiMe_3$.

FIGS. 4(a) and 4(b) show excitation spectra and differential spectra of $SiO_2$:Eu$(15C5)^{3+}$, $Me_3SiSiMe_3$ and $SiO_2$:Eu$(15C5)^{3+}$, $Me_3SnSnMe_3$ before and after the laser irradiation at 77K, respectively.

An excitation spectrum corresponding to $^7Fo$-$5Do$ transition of $Eu^{3+}$ ions in a wavelength range of 579 to 581 mm was observed in the samples not irradiated. When the rhodamine 6G coolants laser was irradiated upon these samples at a rate of 100 mW/mm$^2$ for 600 seconds, a half-value width of 0.125 in was observed as shown in FIGS. 4(a) and 4(b).

In the sample with no crown ether added, no hole was formed, although the intensity of the light emission over the entire spectrum merely decreased through being irradiated with the laser. This revealed that as compared with the $Eu^{3+}$ ions alone, the $Eu^{3+}$ ions forming a complex with the crown ether more readily receive electrons from in the matrix $Me_3SiSiMe_3$ when in the erected state, so that they can more effectively form the hole.

Figure 5:
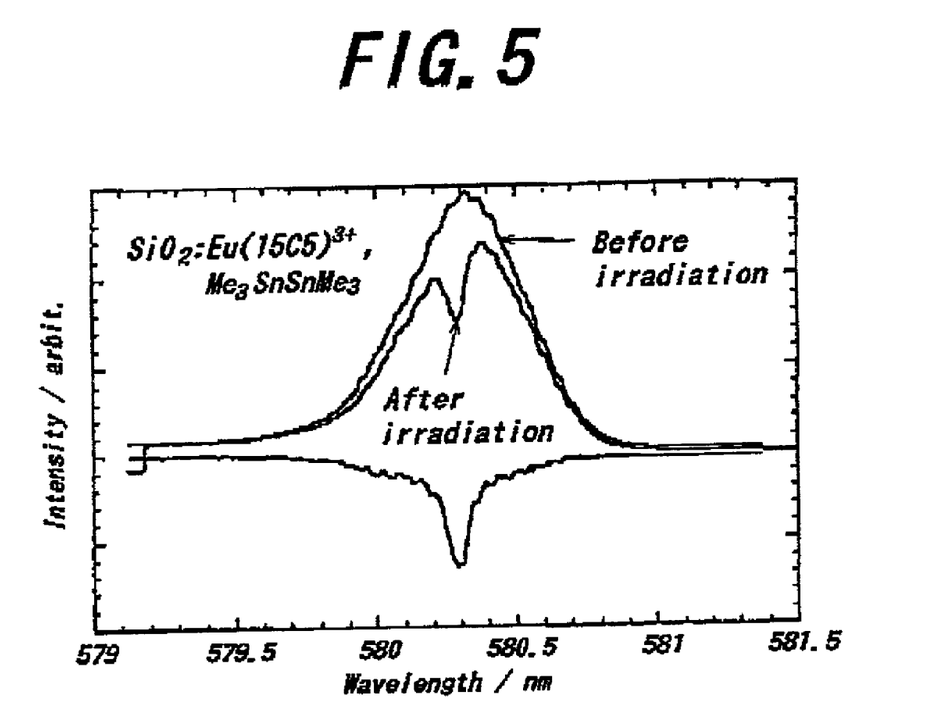
FIG. 5 is a graph showing spectra of the optochemical hole burning medium of $SiO_2$:$Eu(15C5)^{3+}Me_3SnSnMe_3$ according to another embodiment of the present invention before and after laser beam irradiation.

Spectra were observed with respect to $SiO_2$:Eu$(15C5)^{3+}$ and $Me_3SnSnMe_3$. FIG. 5 shows an excitation spectrum and a differential spectrum of $SiO_2$:Eu$(15C5)^{3+}$, $Me_3SnSMe_3$ at 77K before and after the laser irradiation.

As a result, the formation of hole was confirmed with respect to $Me_3SnSnMe_3$ to which the crown ether was incorporated (half-value width 0.141 nm). With respect to the sample containing no crown ether no hole was formed. Therefore, it was clarified that as compared with the $Eu^{3+}$ ions alone, the $Eu^{3+}$ ions forming a complex with the crown ether more readily receive electrons from $Me_3SnSnMe_3$ in the matrix when in the erected state, so that they can more effectively form the holes.

Example 4

Next, the heat cycle characteristic was examined with respect to an optochemical hole burning medium according to one embodiment of the present invention.

First, $SiO_2$:Eu$(15C5)^{3+}$+$Me_3SiSiMe_3$, $SiO_2$:Eu$(15C5)^{3+}$+$Me_3SnSnMe_3$ and $SiO_2$:Eu$(15C5)^{3+}$ were prepared. $SiO_2$:Eu$(15C5)^{3+}$+$Me_3SnSnMe_3$ was prepared in the same manner as in Example 3 except that $Me_3SnSnMe_3$ was used instead of $Me_3SiSiMe_3$. Further, $SiO_2$:Eu$(15C5)^{3+}$ was prepared in the same manner as in Example 3 except that no electron-donating composite compound was used.

Figure 6:
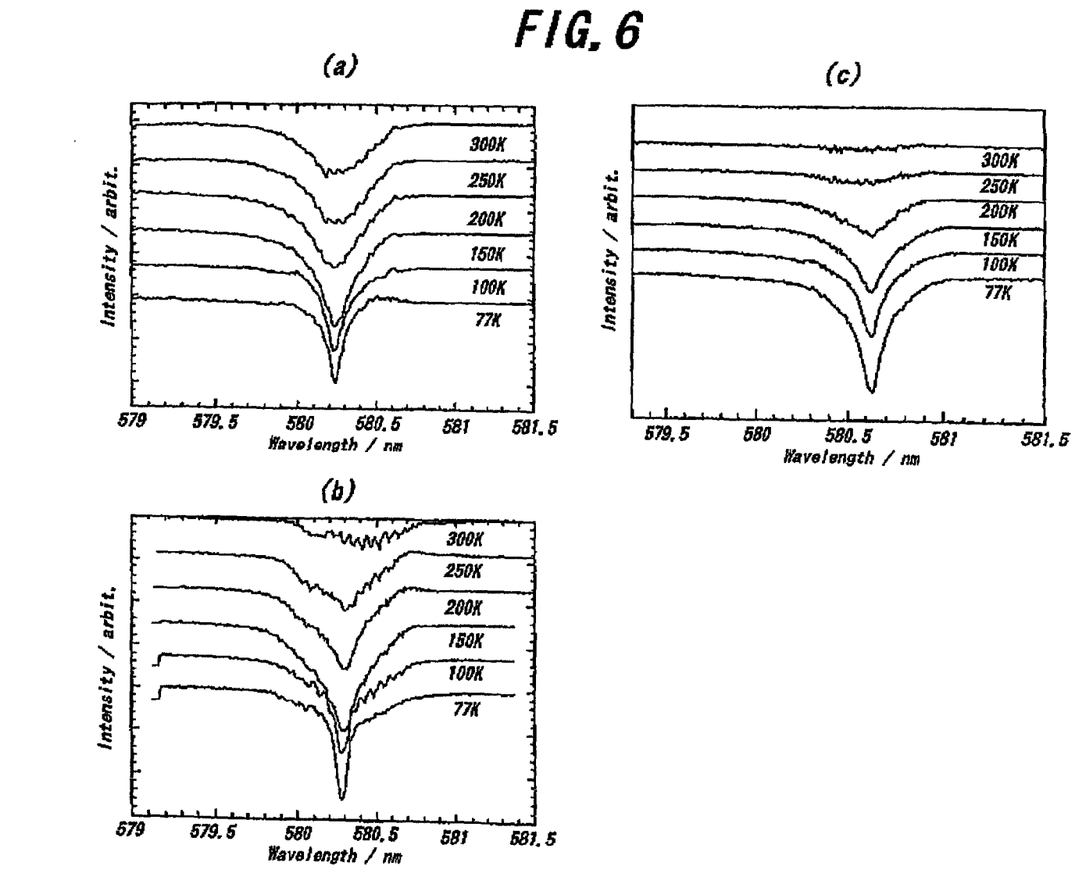

With respect to these samples, the heat cycle characteristic was examined. That is, the heat cycle characteristic of a hole formed at 77K in each of the $SiO_2$, Eu$(15C5)^{3+}$+$Me_3SiSiMe_3$ and $SiO_2$:Eu$(15C5)^{3+}$+$Me_3SnSnMe_3$ in a temperature range of 77 to 300K were examined. Results are shown in FIGS. 6(a) to 6(c). FIG. 6(a) shows a heat cycle characteristic of $SiO_2$:Eu$(15C5)^{2+}$+$Me_3SiSiMe_3$, and FIGS. 6(b) and 6(c) shows heat cycle characteristics of $SiO_2$:Eu$(15C5)^{3+}$+$Me_3SnSnMe_3$ and $SiO_2$:Eu$(15C5)^3$, respectively.

In the $SiO_2$:Eu$(15C5)^{3+}$+$Me_3SiSiMe_3$, the hole was maintained up to 300K. In the $SiO_2$:Eu$(15C5)^{3+}$+$Me_3SnSnMe_3$, the hole was maintained up to 250K, With increase in temperature, the uniform width increases, whereas the depth of the holes decreases. When the sample contains $Me_3SiSiMe_3$, the holes having about 70% of that of the holes at 77K with the half-value width of 0.79 nm was maintained at 300K. When the sample contains $Me_3SnSnMe_3$, the hole having about 61% of that of the hole at 77K with the half-value width of 0.474 nm was maintained at 250K. Therefore, it is seen that the medium to which the reducing agent is added has improved temperature stability of the hole as compared with the crown ether complex alone. This is considered such that when $Me_3MMMe_3$(M=Si or Sn) functioning as the reducing agent is incorporated, the M—M bond is cleaved through the reduction to make a reverse reaction difficult to occur.

Example 5

Next, the heat cycle characteristic was examined while the concentration of the reducing agent was varied. Samples were prepared according to the method described in Example 3. $Me_3SiSiMe_3$ was used as the reducing agent.

Figure 7:
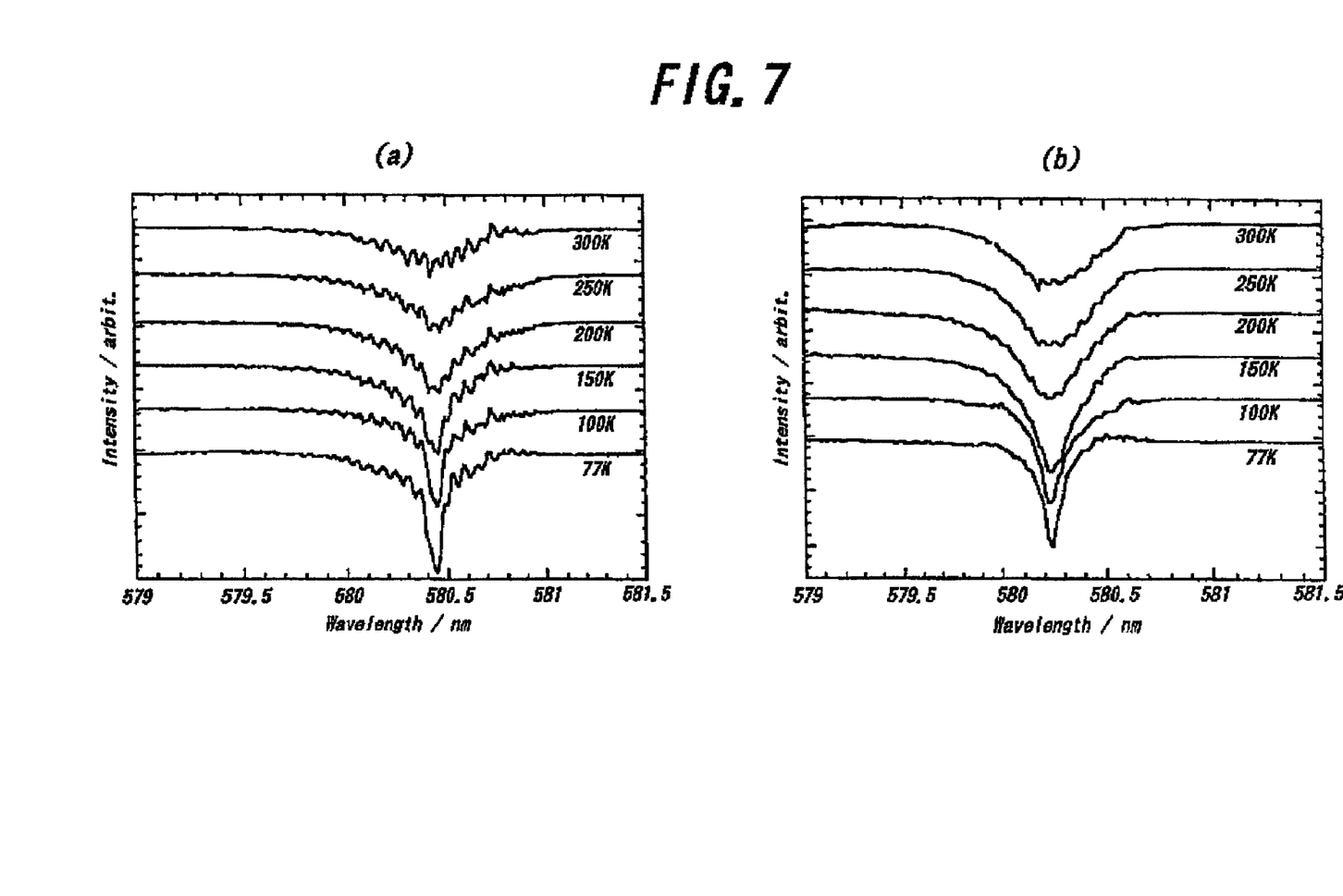
Figure 8:
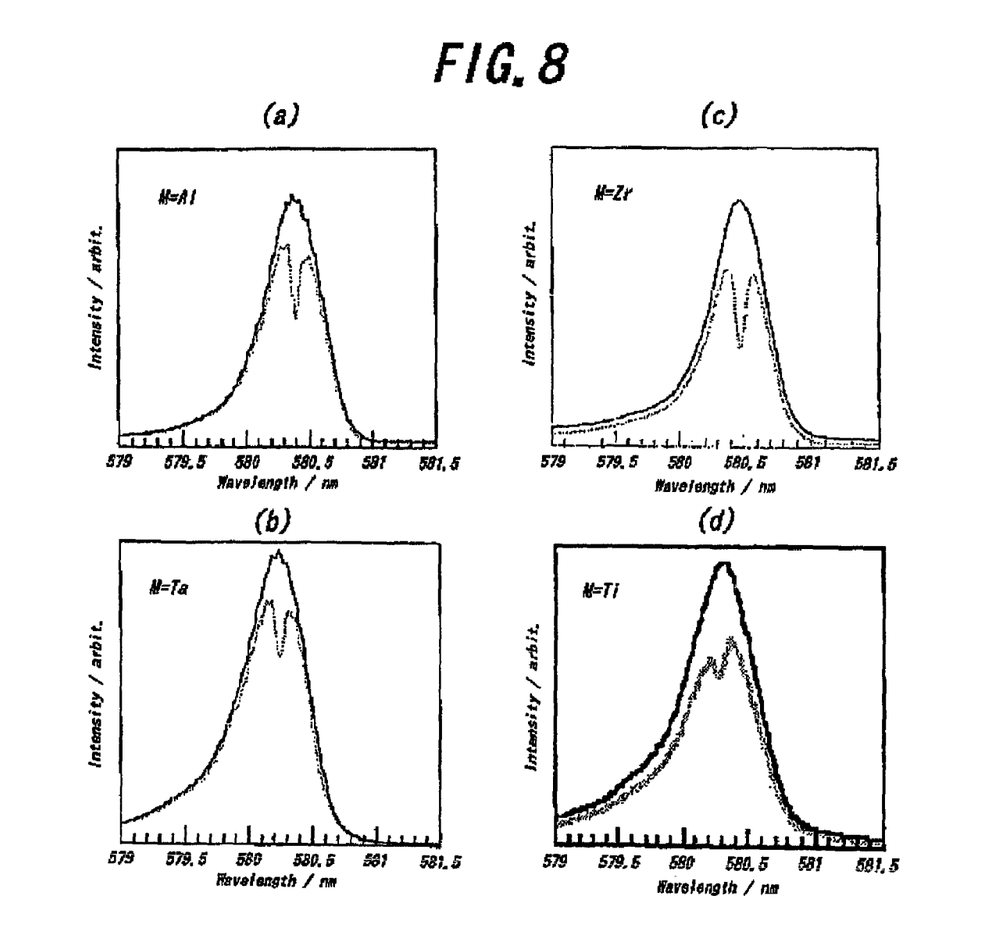
FIGS. 8(a) to 8(d) are graphs showing excitation spectra of $SiO_2$:$M_xO_y$ (Si:M=7:3):$[Eu(15C5)]^{3+}$ ($Eu^{3+}$:15C5=1:3) at 77K before and after laser irradiation.

Results on the heat cycle characteristic are shown in FIGS. 7(a) and 7(b). FIGS. 7(a) and 7(b) show the heat cycle characteristics of $SiO_2$:Eu$(15C5)^{3+}$+$Me_3SiSiMe_3$ in which FIGS. 7(a) and 7(b) correspond to uses of 3 mol % and 6 mol % of $Me_3SiSiMe_3$, respectively.

As obvious from FIGS. 7(a) and 7(b), it is seen that the case using 6 mol % of $Me_3SiSiMe_3$ exhibited higher stability of the hole as compared with the case using 3 mol % of $Me_3SiSiMe_3$. This is considered such that increase in $Me_3SiSiMe_3$ increased the amount of Eu$(15C5)^{3+}$, so that the holes became difficult to return correspondingly.

Example 6

Next, spectra were examined when the solid matrix was modified. Solid matrixes in which $Al_2O_3$, $TiO_2$ or $Ta_2O_5$ was incorporated into $SiO_2$ were used. Samples were prepared similarly according to the method described in Example 1.

Laser were irradiated upon each of these samples, and their excitation spectra were observed. FIGS. 8(a) to 8(d) show excitation spectra of $SiO_2$-MxOy (Si:M=7:3):[Eu$(15C5)^{3+}$]$^{3+}$ (Eu$^{3+}$:15C5=1:3) at 77K before and after laser irradiation.

In each of the cases, the depth of the hole was not conspicuously different from that in the case with $SiO_2$ alone.

With respect to the width of the hole, when $Al_2O_3$ was introduced into $SiO_2$, $Al^{3+}$ bonds to non-crosslinking oxygen to form a network as [$AlO_4$]. Thereby, the local structure near the $Eu^{3+}$ ions is strengthened to narrow the width of the hole. It is considered that similar effect is produced in the case of the incorporation of $ZrO_2$ and $Ta_2O_5$.

To the contrary, when $TiO_2$ was incorporated into $SiO_2$, the hole width tended to increase as compared with $SiO_2$. This is considered that [$TiO_4$] bonds to the crosslinking oxygen rather than non crosslinking oxygen.

Figure 9:
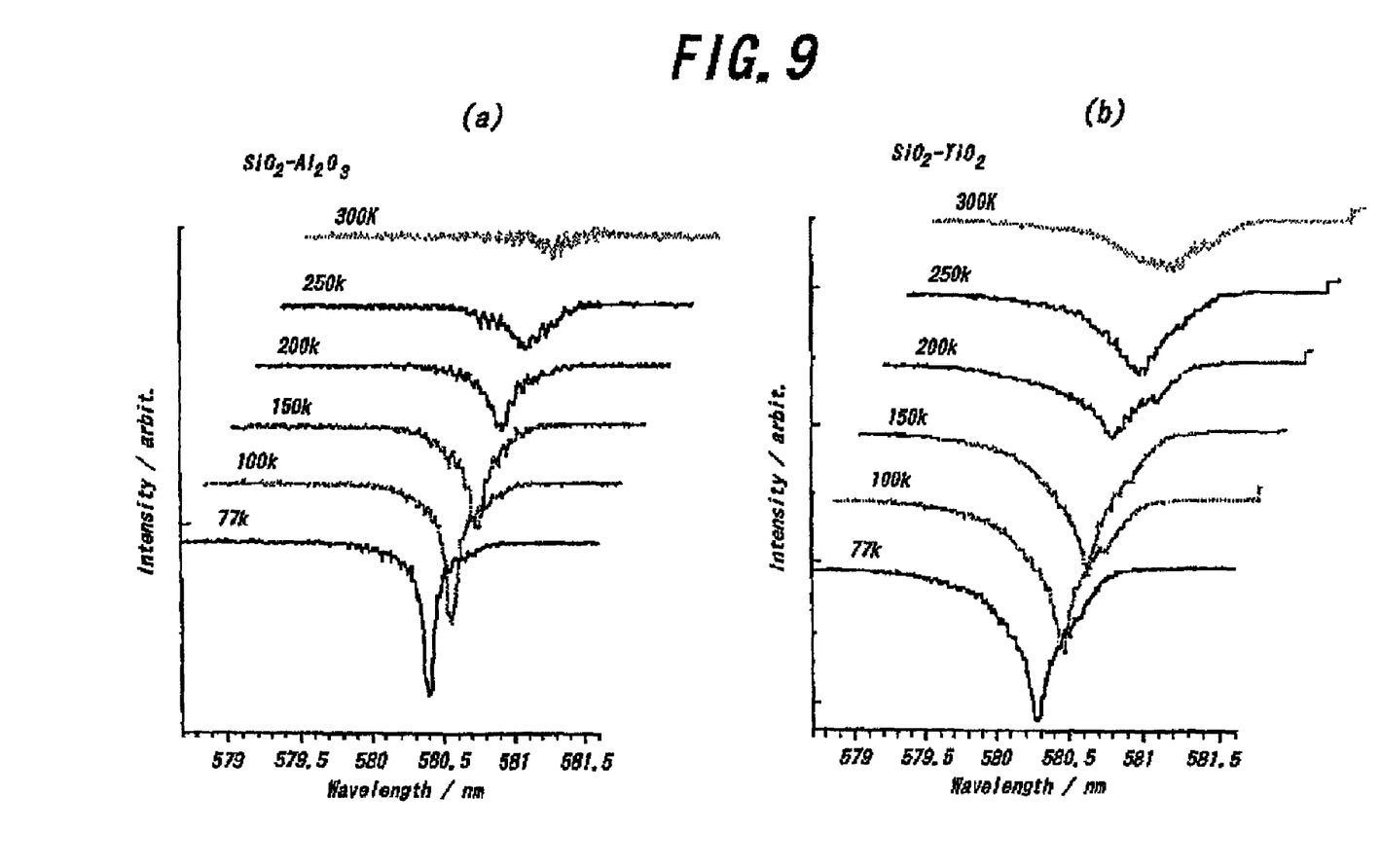
FIGS. 9(a) and 9(b) are graphs showing heat cycle characteristics of hole burning media of the $SiO_2$:$M_xO_y$:$[Eu(15C5)]^{3+}$ media irradiated at 77K.
Figure 10:
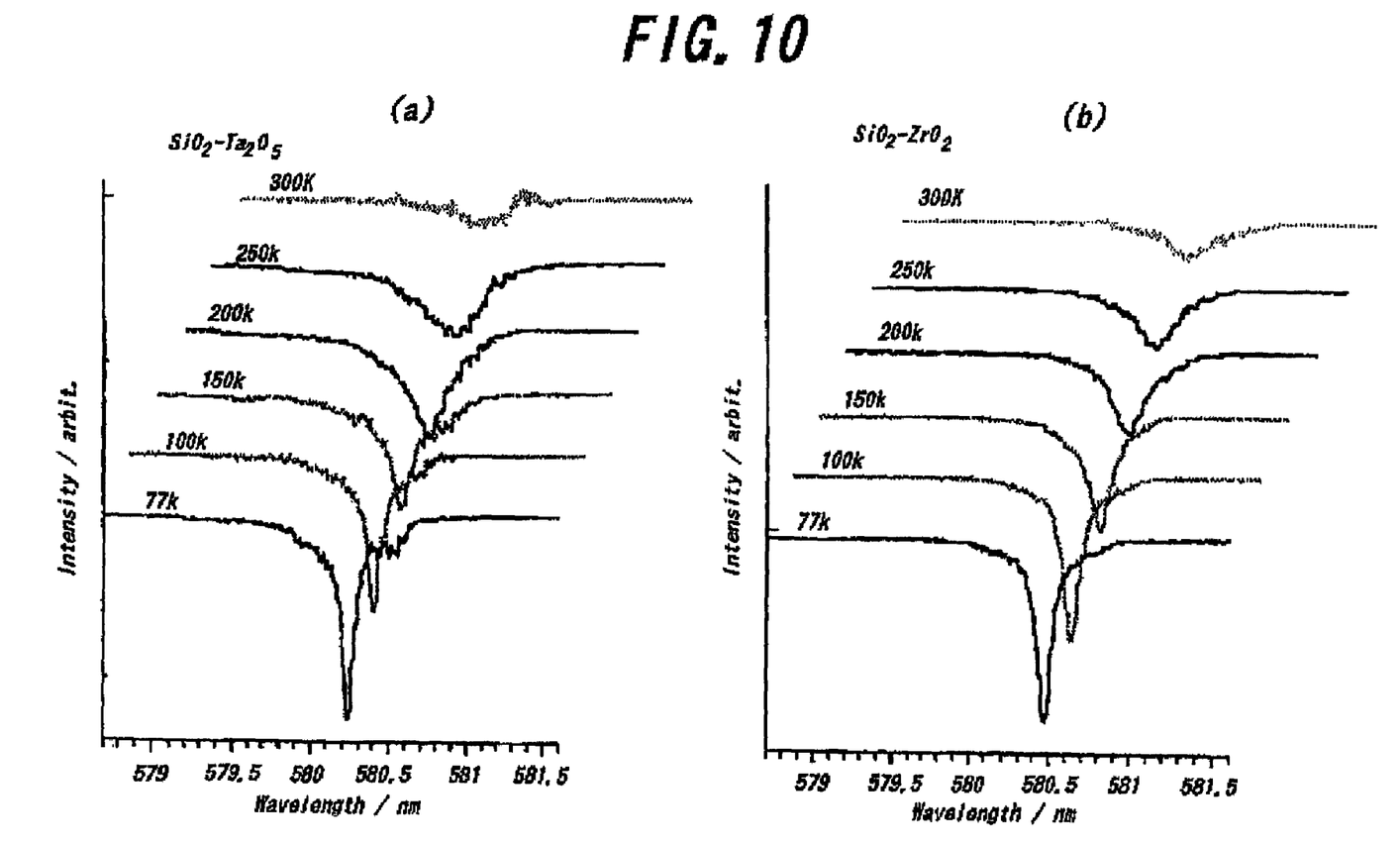
FIGS. 10(a) and 10(b) are graphs showing heat cycle characteristics of hole burning media of $SiO_2$:$M_xO_y$:$[Eu(15C5)]^{3+}$ at 77K.

Next, the heat cycle characteristic of the above samples was examined. FIGS. 9 and 10 show the heat cycle characteristics of holes formed at 77K in $SiO_2$-MxOy:[Eu$(15C5)$]$^{3+}$.

In each case, the hole was coded the heat cycles down to room temperature. Particularly, the incorporation of $ZrO_2$ and $Ta_2O_5$ retained deeper holes at room temperature as compared with $Al_2O_3$.

Any of the solid matrixes used exhibited high stability of the holes at high temperatures. This is considered such that the local structure near the $Eu^{3+}$ ions was strengthened and the lattice vibration was suppressed by the addition of the heavy element.

The hole burning medium according to the present invention has the advantageous effect that signals can be written therein depending upon the wavelength of the laser beam irradiated.

Example 7

A photochemical hole burning medium was prepared in the same manner as in Example 1, and tested in the same manner as in Example 3 except that indene was used as a reducing agent.

Figure 11:
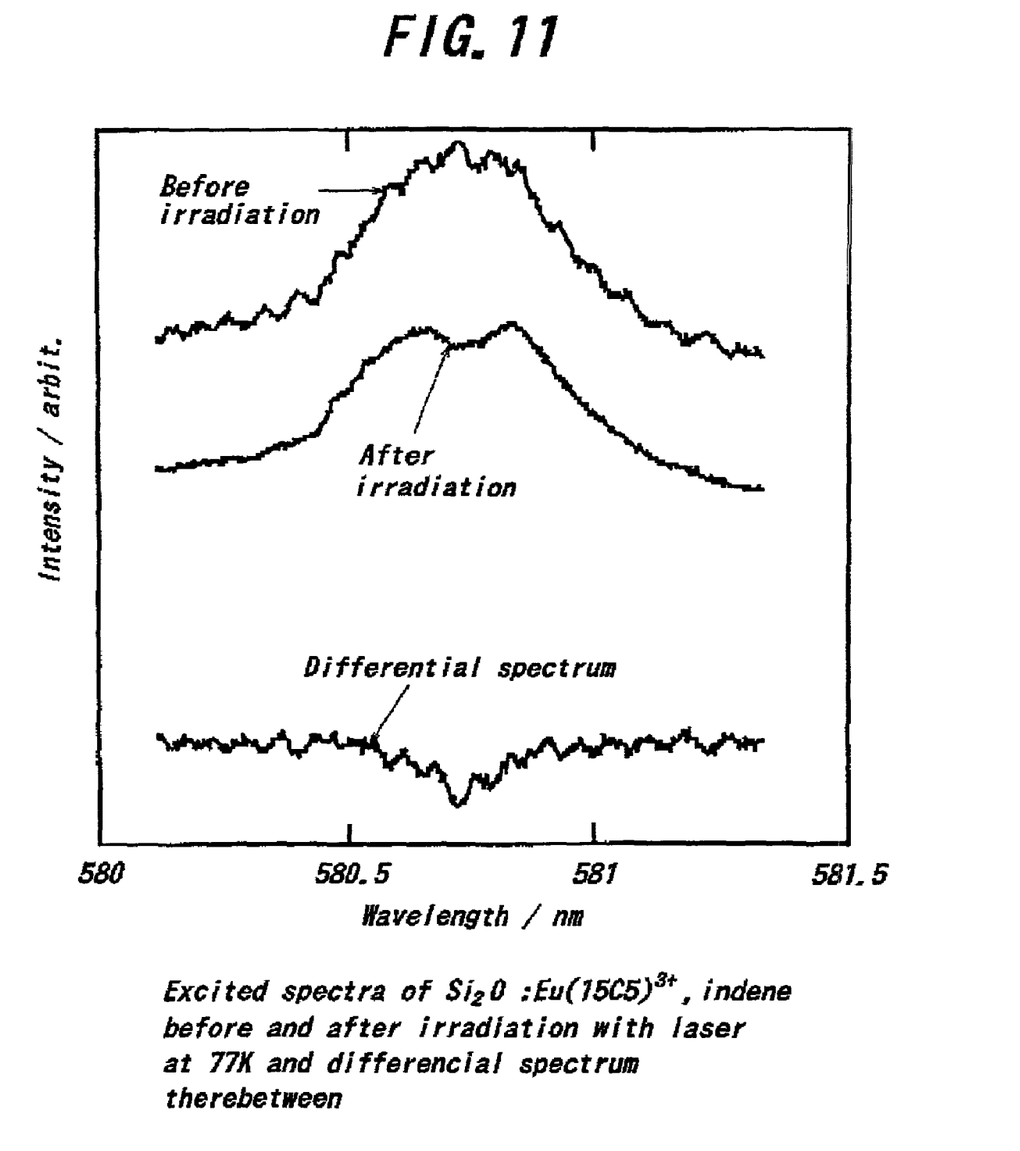
FIG. 11 shows excitation spectra of $SiO_2$:$Eu(15C5)^{3+}$ $C_9H_8$ (indene) before and after irradiation with laser at 77 K and a differential spectrum therebetween.

FIG. 11 shows excited spectra of $SiO_2$:$Eu(15C5)^{3+}$, indene before and after irradiation with laser at 77 K and a differential spectrum therebetween.

As a result, formation of a hole was confirmed. From this result, it is seen that any reducing agent can well function as the reducing agent and form a stable hole, so long as its oxidation/reduction potential is equal to or lower than that of indene. The oxidation/reduction potentials of organic molecules are summarized in below Table 2.

TABLE 2

| reducing agents | $E^0(D^+/D)$ |
|---|---|
| N,N,N-tetramethyl-p-phenylene diamine | 0.16 |
| N,N,N-tetramethyl benzidine | 0.32 |
| 1,4-diazabicyclo[2,2,2]octane | 0.57 |
| hexamethyl ditin | 0.68 |
| N,N-dimethylaniline | 0.76 |
| hexamethyl disilane | 0.92 |
| triethylamine | 0.96 |
| 2-methoxynaphthalene | 1.42 |
| 1,1-diphenylethylene | 1.52 |
| indene | 1.52 |

It is seen that the reducing agents shown in Table 2 all have the oxidation/reduction potentials lower to that of indene, and are well used.

The hole burning medium according to the present invention has the advantageous effect that it enables the wavelength-multiple type optical memory operable at room temperature.

What is claimed is:

1. A photochemical hole burning medium, comprising a material in which a rare earth complex and a reducing agent are dispersed in a solid matrix; wherein the photochemical hole burning medium is used at low temperatures; and said rare earth complex is at least one complex selected from the group consisting of a europium (Ill) crown ether complex, a europium (III) polyether complex, and a europium (III) cryptand complex, wherein said reducing agent is an organic tin compound represented by RSnSnR in which R is an alkyl group or an aryl group.

2. The photochemical hole burning medium set forth in claim 1, wherein said solid matrix is at least one glass-forming compound selected from the group consisting of silica, germanium oxide, boron oxide, phosphorus pentaoxide and tellurium oxide.

3. The photochemical hole burning medium set forth in claim 2, wherein at least one compound selected from the group consisting of $Al_2O_3$, $Ga_2O_3$, $In_2O_3$, $TiO_2$, $ZrO_2$, $Nb_2O_5$ and $Ta_2O_5$ is contained in said solid matrix.

4. The photochemical hole burning medium set forth in claim 1, wherein the reducing agent has an oxidation/reduction potential of not more than 1 V.

\* \* \* \* \*

UNITED STATES PATENT AND TRADEMARK OFFICE
CERTIFICATE OF CORRECTION

| | | |
|---|---|---|
| PATENT NO. | : 6,994,947 B2 | Page 1 of 1 |
| APPLICATION NO. | : 10/084480 | |
| DATED | : February 7, 2006 | |
| INVENTOR(S) | : Machida | |

It is certified that error appears in the above-identified patent and that said Letters Patent is hereby corrected as shown below:

On the Title Page

Item (56), under "OTHER PUBLICATIONS", Line 2, delete "Chem" and insert -- Chem. --, therefor.

Item (56), under "OTHER PUBLICATIONS", Line 11, delete "Phys." and insert -- J. Phys. --, therefor.

Item (56), under "OTHER PUBLICATIONS", Line 17, delete "rrare" and insert -- rare --, therefor.

In Fig. 11, Sheet 11 of 11, delete "and differencial" and insert -- and differential --, therefor.

In Column 1, Line 22, delete "(PBB)" and insert -- (PHB) --, therefor.

In Column 2, Line 2, delete "be" and insert -- he --, therefor.

In Column 2, Line 13, delete "polyester" and insert -- polyether --, therefor.

In Column 4, Line 12, delete "are" and insert -- rare --, therefor.

In Column 4, Line 35, delete "ready" and insert -- readily --, therefor.

In Column 4, Line 39, delete "rare ions," and insert -- rare earth ions, --, therefor.

In Column 5, Line 30, delete "colarant" and insert -- colorant --, therefor.

In Column 5, Line 46, delete "become" and insert -- became --, therefor.

In Column 7, Line 6, delete "colarant" and insert -- colorant --, therefor.

In Column 7, Line 18, delete "581 mm" and insert -- 581 nm --, therefor.

In Column 7, Line 20, delete "coolants" and insert -- colorant --, therefor.

In Column 7, Line 22, delete "in" and insert -- nm --, therefor.

In Column 7, Line 39, delete "ether no" and insert -- ether, no --, therefor.

In Column 8, Line 3, delete "250K," and insert -- 250K. --, therefor.

In Column 8, Line 8, delete "0.79" and insert -- 0.479 --, therefor.

In Column 8, Line 64, delete "coded the" and insert -- confirmed after the --, therefor.

In Column 10, Line 2, delete "to" and insert -- than --, therefor.

Signed and Sealed this
Tenth Day of April, 2012

David J. Kappos
*Director of the United States Patent and Trademark Office*